United States Patent
Wilson

(10) Patent No.: US 10,903,780 B2
(45) Date of Patent: Jan. 26, 2021

(54) RECHARGEABLE BATTERY POWERED GENERATOR

(71) Applicant: Bill Wilson, Barnsdall, OK (US)

(72) Inventor: Bill Wilson, Barnsdall, OK (US)

( * ) Notice: Subject to any disclaimer, the term of this patent is extended or adjusted under 35 U.S.C. 154(b) by 95 days.

(21) Appl. No.: 16/242,635

(22) Filed: Jan. 8, 2019

(65) Prior Publication Data

US 2020/0220490 A1    Jul. 9, 2020

(51) Int. Cl.
| | |
|---|---|
| *H02S 10/40* | (2014.01) |
| *H01M 10/46* | (2006.01) |
| *H02S 40/38* | (2014.01) |
| *H02S 20/30* | (2014.01) |
| *H02J 7/14* | (2006.01) |
| *H02J 7/35* | (2006.01) |

(52) U.S. Cl.
CPC ........... *H02S 10/40* (2014.12); *H01M 10/465* (2013.01); *H02J 7/1423* (2013.01); *H02J 7/35* (2013.01); *H02S 20/30* (2014.12); *H02S 40/38* (2014.12); *H01M 2220/10* (2013.01)

(58) Field of Classification Search
CPC ........ H02J 3/38; H02J 3/14; H02J 7/35; H02J 7/00; H02J 2003/003; H02J 2003/143; H02S 20/22; H02S 40/32; H02S 40/38; H04L 12/28; H04L 12/2803; H01M 10/46; F21L 4/08
USPC ........ 307/20, 108, 82, 80, 87; 320/111, 120, 320/101; 362/183
See application file for complete search history.

(56) References Cited

U.S. PATENT DOCUMENTS

| | | |
|---|---|---|
| 5,111,127 A | 5/1992 | Johnson |
| 6,677,730 B2 | 1/2004 | Bedini |
| 8,593,102 B2 * | 11/2013 | McGuire ................. F03D 13/40 320/101 |
| D704,137 S | 5/2014 | Shokrzadeh |
| 8,854,794 B2 | 10/2014 | Van Straten |
| 9,515,516 B2 | 12/2016 | Baker |
| 2004/0164702 A1 * | 8/2004 | Holmes ................. H02J 7/0068 320/101 |
| 2008/0309290 A1 | 12/2008 | Johnson |
| 2011/0109101 A1 | 5/2011 | Whitney |
| 2011/0181233 A1 * | 7/2011 | Mino ...................... B60L 53/51 320/101 |
| 2012/0300440 A1 * | 11/2012 | Miyamae ............ H01M 10/613 362/183 |
| 2015/0061568 A1 | 3/2015 | Martinez |
| 2017/0047770 A1 * | 2/2017 | Imperial ................. H02S 40/44 |
| 2020/0052491 A1 * | 2/2020 | Silva ....................... H02J 3/383 |
| 2020/0161859 A1 * | 5/2020 | Bell .......................... H02J 3/14 |

* cited by examiner

*Primary Examiner* — Rexford N Barnie
*Assistant Examiner* — Jagdeep S Dhillon

(57) ABSTRACT

A rechargeable battery powered generator for quiet, off-grid power production includes a housing having a front panel separated from a rear panel, a top panel separated from a bottom panel, and a left panel separated from a right panel forming an inner compartment. A plurality of solar panels is coupled to the top panel. A plurality of batteries, a generator, and an electrical system are coupled to the housing. A plurality of outlets is coupled to the housing. The electrical system converts energy from the plurality of solar panels to charge the plurality of batteries, powers the generator from the plurality of batteries, and converts power from the plurality of batteries and the generator to the plurality of outlets.

11 Claims, 4 Drawing Sheets

RECHARGEABLE BATTERY POWERED GENERATOR

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to generators and more particularly pertains to a new generator for quiet, off-grid power production.

BRIEF SUMMARY OF THE INVENTION

An embodiment of the disclosure meets the needs presented above by generally comprising a housing having a front panel separated from a rear panel, a top panel separated from a bottom panel, and a left panel separated from a right panel. The front panel, the rear panel, the top panel, the bottom panel, the left panel, and the right panel form an inner compartment. The front panel is removable. A plurality of solar panels is coupled to the top panel. A plurality of batteries is coupled within the inner compartment. A generator is coupled within the inner compartment and is in operational communication with the plurality of batteries. A plurality of outlets is coupled to the front panel and is in operational communication with the plurality of batteries and the generator. An electrical system is coupled within the inner compartment and is in operational communication with each of the plurality of solar panels, the plurality of batteries, and the generator. The electrical system converts energy from the plurality of solar panels to charge the plurality of batteries, powers the generator from the plurality of batteries, and converts power from the plurality of batteries and the generator to the plurality of outlets.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
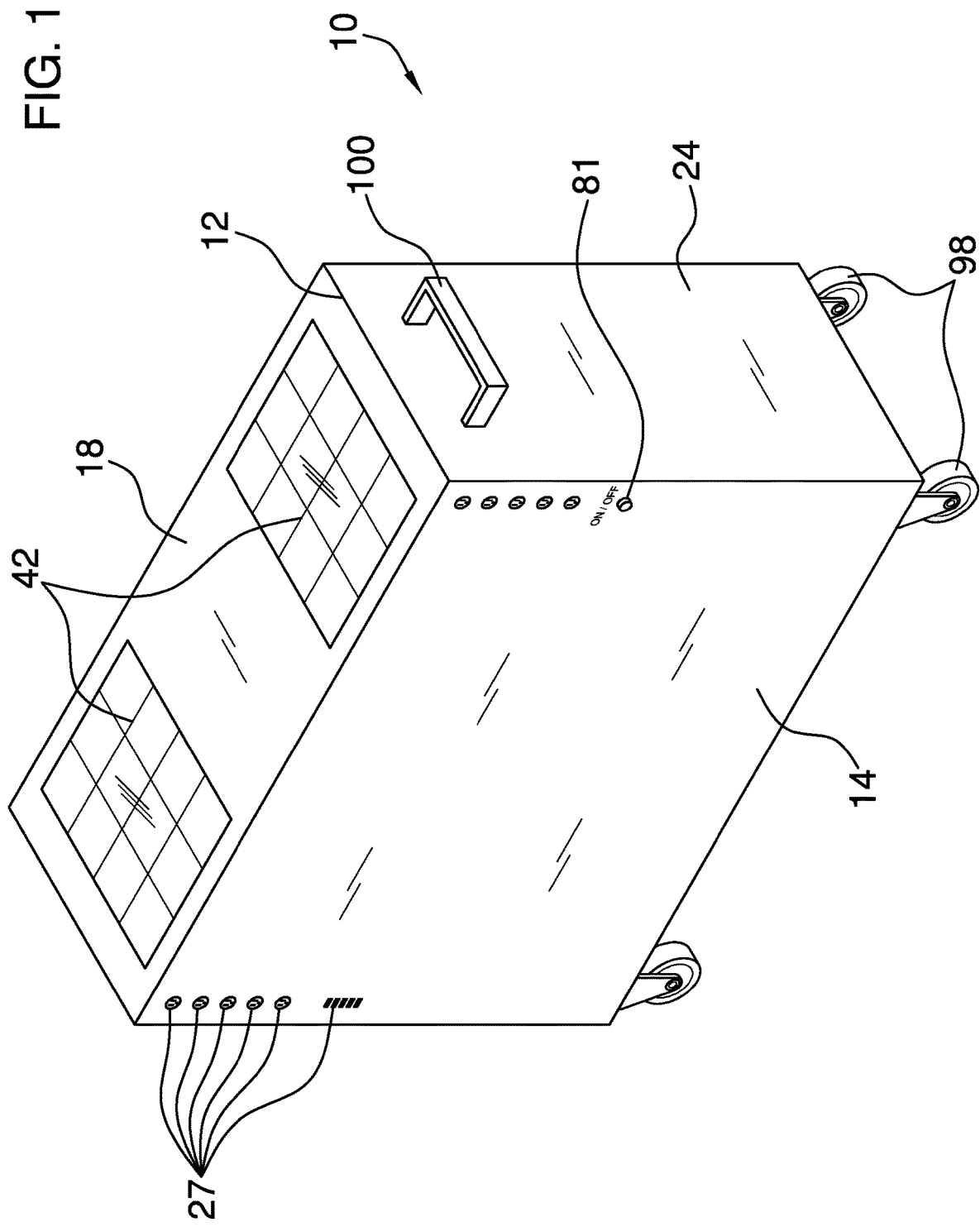
FIG. 1 is an isometric view of a rechargeable battery powered generator according to an embodiment of the disclosure.
Figure 2:
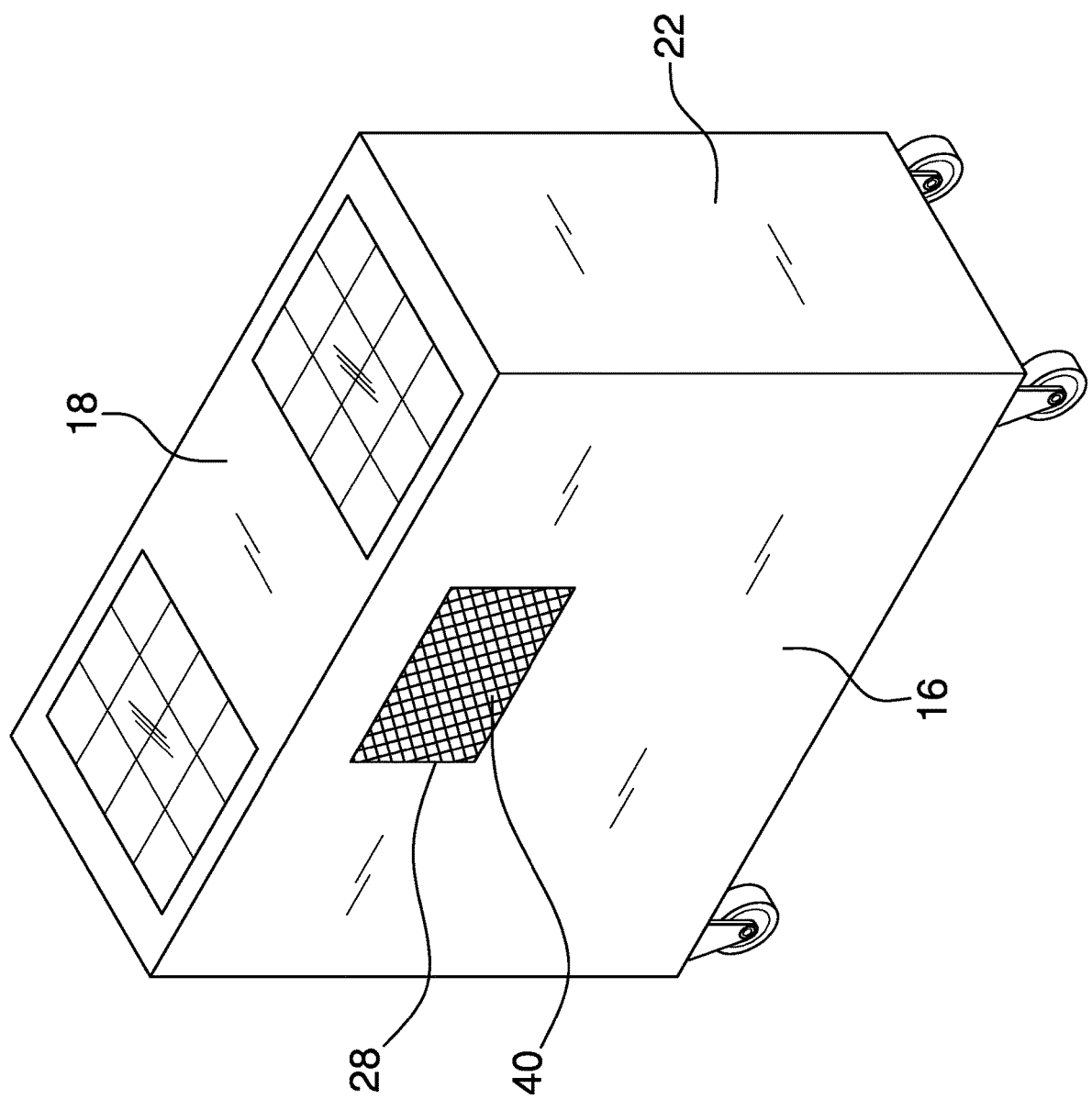
FIG. 2 is an isometric view of an embodiment of the disclosure.
Figure 3:
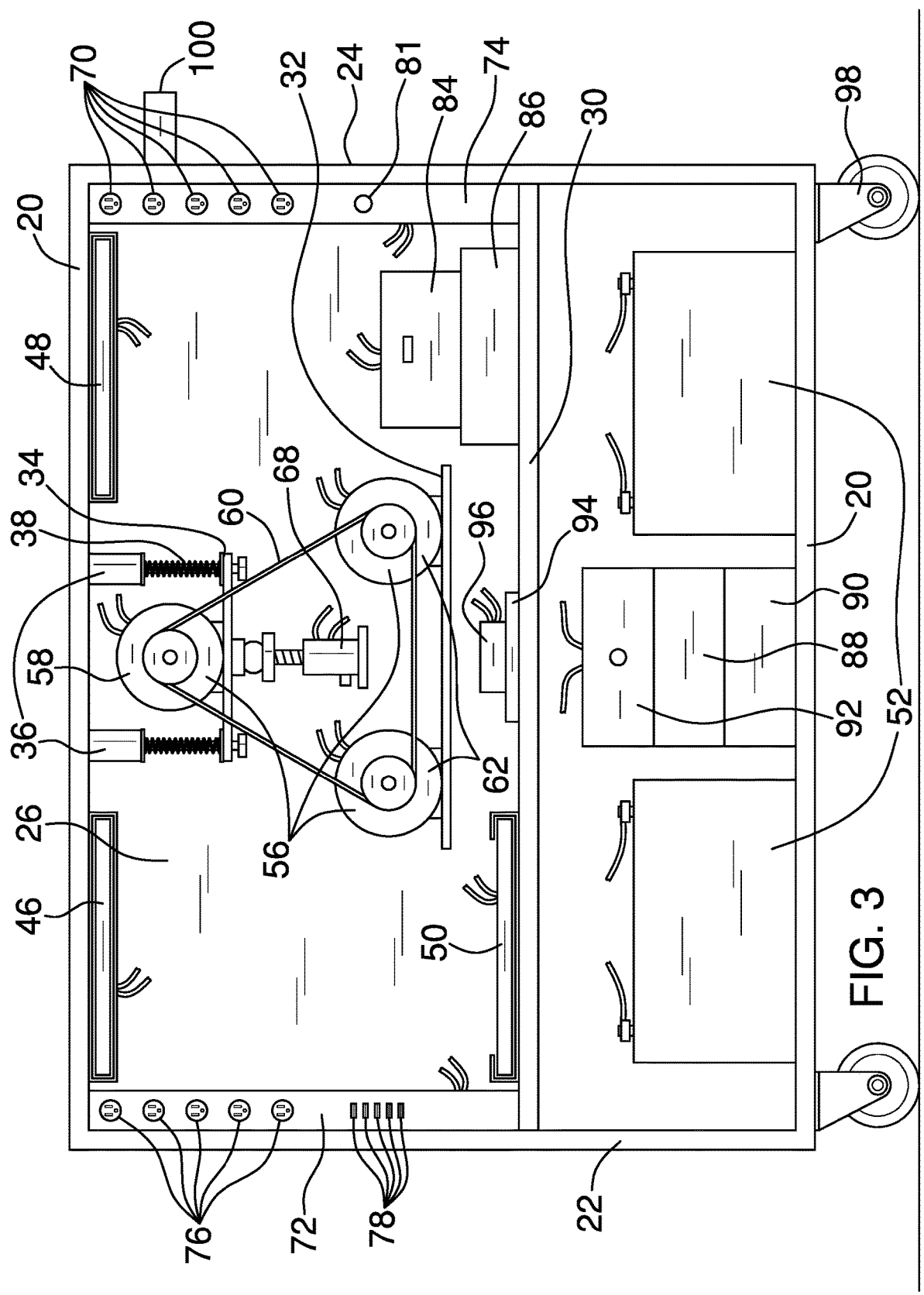
FIG. 3 is a front elevation view of an embodiment of the disclosure.
Figure 4:
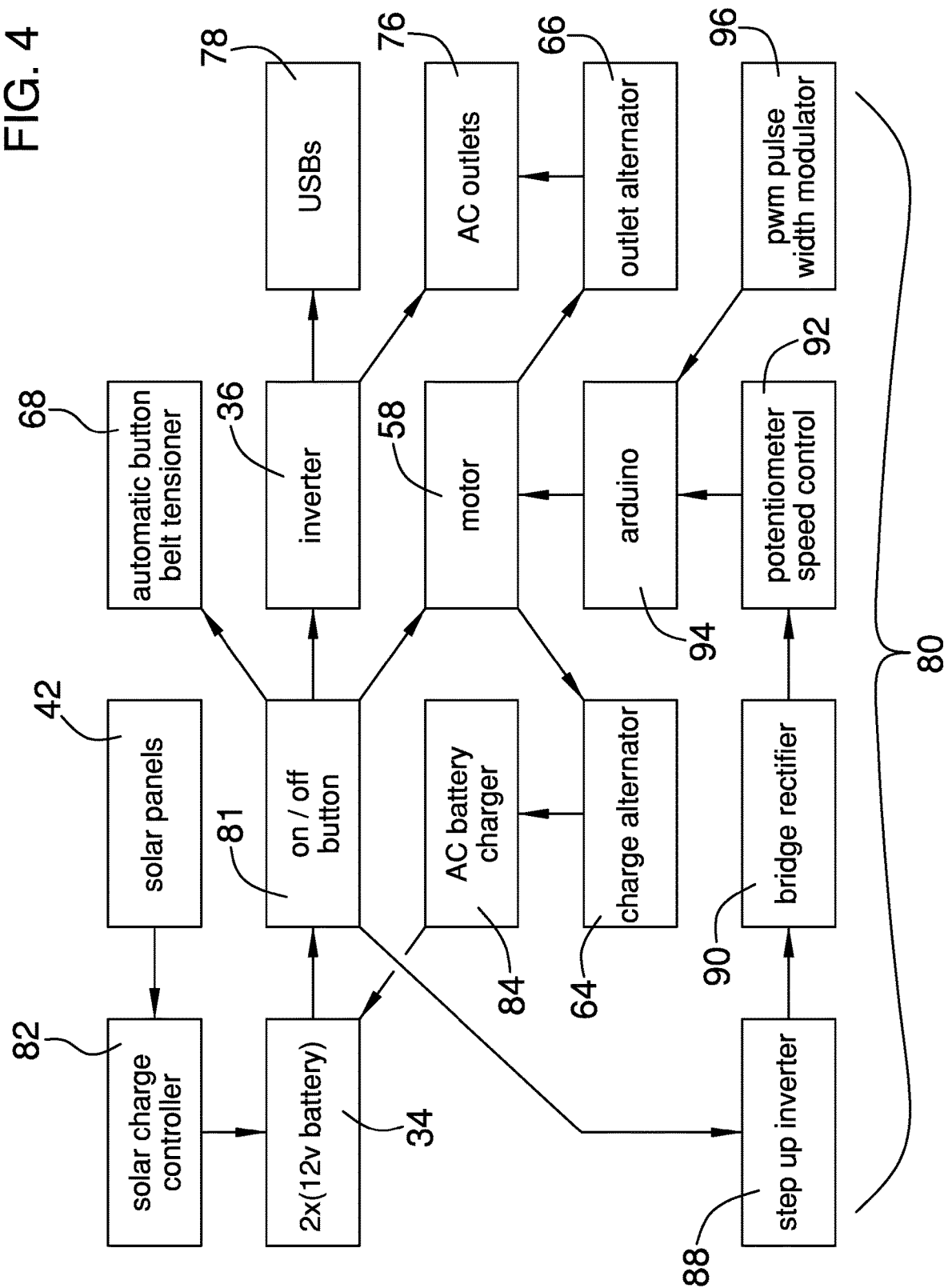
FIG. 4 is a block diagram of an embodiment of the disclosure.

With reference now to the drawings, and in particular to FIGS. 1 through 4 thereof, a new generator embodying the principles and concepts of an embodiment of the disclosure and generally designated by the reference numeral 10 will be described.

As best illustrated in FIGS. 1 through 4, the rechargeable battery powered generator 10 generally comprises a housing 12 having a front panel 14 separated from a rear panel 16, a top panel 18 separated from a bottom panel 20, and a left panel 22 separated from a right panel 24. The front panel 14, the rear panel 16, the top panel 18, the bottom panel 20, the left panel 22, and the right panel 24 form an inner compartment 26. The front panel 14 has a plurality of outlet apertures 27 and is removable to provide access to the inner compartment 26. The rear panel 16 may have a vent aperture 28 extending through to the inner compartment 26 to control the temperature within the housing 12. The housing 12 may have a main shelf 30, an alternator shelf 32, and a motor shelf 34. The main shelf 30 is coupled to the rear panel 16, the left panel 22, and the right panel 24. The alternator shelf 32 is coupled to the rear panel 16 above the main shelf 30. The motor shelf 34 is suspended from the top panel 18 by a pair of arms 36. Each of the pair of arms 36 has a compression spring 38. A vent cover 40 is coupled to the vent aperture 28.

A plurality of solar panels 42 is selectively engageable with a plurality of solar panel trays 44. The plurality of solar panel trays 44 comprises a left solar panel tray 46 coupled to the top panel 18 proximal the left panel 22, a right solar panel tray 48 coupled to the top panel 18 proximal the right panel 24, and a storage solar panel tray 50 coupled on the main shelf 30. The plurality of solar panels 42 is slid into the left solar panel tray 46 and the right solar panel tray 48 when in use and may be slid into the storage solar panel tray 50 when in transport. A plurality of batteries 52 is coupled on the bottom panel 20 within the inner compartment 26. The plurality of batteries 52 may be a pair of 12V batteries 54.

A generator 56 is coupled within the inner compartment 26 and may comprise a motor 58, a belt 60, and a pair of alternators 62. The belt 60 is coupled to each of the motor 58 and the pair of alternators 62. The pair of alternators 62 is coupled on the alternator shelf 32 and the motor 58 is coupled on the motor shelf 34. The pair of compression spring 38 of the each of the pair of arms 36 provides tension on the belt 60. The motor 58 is in operational communication with the plurality of batteries 52. The pair of alternators 62 comprises a charge alternator 64 and an outlet alternator 66. An automatic button belt tensioner 68 may be coupled to the rear panel 16 below the motor shelf 34. The automatic button belt tensioner 68 is in operational communication with the motor shelf 34 to lowering and alternatively raise the motor shelf 34 to decrease and alternatively increase tension in the belt 60. A plurality of outlets 70 is coupled to each of the left panel 22 and the right panel 24 adjacent the plurality of outlet apertures 27 of the front panel. The plurality of outlets 70 is in operational communication with the plurality of batteries 52 and the outlet alternator 66. The plurality of outlets 70 comprises a left outlet bank 72 and a right outlet bank 74 each having a plurality of AC outlets 76. The left outlet bank 72 has a plurality of USB ports 78.

An electrical system 80 is coupled within the inner compartment 26. The electrical system 80 is in operational communication with each of the plurality of solar panels 42, the plurality of batteries 52, and the generator 56. The electrical system 80 converts energy from the plurality of solar panels 42 to charge the plurality of batteries 52, powers the generator 56 from the plurality of batteries 52, and converts power from the plurality of batteries 52 and the generator 56 to the plurality of outlets 70. The electrical system 80 may comprise a power switch 81, a solar charge controller 82, a battery charger 84, an inverter 86, a step-up inverter 88, a bridge rectifier 90, a potentiometer speed control 92, a microcontroller 94, and a pulse width modulator 96. The power switch 81 is in operational communication with the plurality of batteries 52. The solar charge controller 82 is in operational communication with the plurality of solar panels 42 and the plurality of batteries 52. The battery charger 84 is coupled on the main shelf 30 and is in operational communication with the charge alternator 64 and the plurality of batteries 52. The inverter 86 is coupled on the main shelf 30 and is in operational communication with the plurality of batteries 52 and the plurality of outlets 70. The step-up inverter 88 is coupled on the bottom panel 20 and is in operational communication with the plurality of batteries 52. The bridge rectifier 90 is coupled on the bottom panel 20 and is in operational communication with the step-up inverter 88. The potentiometer speed control 92 is coupled on the bottom panel 20 and is in operational communication with the bridge rectifier 90. The microcontroller 94 is coupled on the main shelf 30 and is in operational communication with the potentiometer speed control 92 and the motor 58 of the generator. The microcontroller may be Arduino. The pulse width modulator 96 is coupled on the main shelf 30 and is in operational communication with the microcontroller 94. A plurality of wheels 98 may be coupled to the bottom panel 20 and a handle 100 may be coupled to the right panel 24 for ease of transport.

In use, the rechargeable battery powered generator 10 is brought to a remote location requiring a quiet power source where a gas-powered generator is not suitable. Power from the plurality of batteries 52 is used to run the generator 56, allowing the plurality of outlets 70 to provide power to electronic devices. The plurality of solar panels and the 42 and the charge alternator 64 replenish the charge of the plurality of batteries 52.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rechargeable battery powered generator comprising:
   a housing having a front panel separated from a rear panel, a top panel separated from a bottom panel, and a left panel separated from a right panel, the front panel, the rear panel, the top panel, the bottom panel, the left panel, and the right panel forming an inner compartment, the front panel being removable, the front panel having a plurality of outlet apertures;
   a plurality of solar panels coupled to the housing, the plurality of solar panels being coupled to the top panel;
   a plurality of batteries coupled to the housing, the plurality of batteries being coupled within the inner compartment;
   a generator coupled to the housing, the generator being coupled within the inner compartment, the generator being in operational communication with the plurality of batteries;
   a plurality of outlets coupled to the housing, the plurality of outlets being coupled to each of the left panel and the right panel adjacent the plurality of outlet apertures of the front panel, the plurality of outlets being in operational communication with the plurality of batteries and the generator; and
   an electrical system coupled to the housing, the electrical system being coupled within the inner compartment, the electrical system being in operational communication with each of the plurality of solar panels, the plurality of batteries, and the generator, the electrical system converting energy from the plurality of solar panels to charge the plurality of batteries, power the generator from the plurality of batteries, and convert power from the plurality of batteries and the generator to the plurality of outlets; and
   the electrical system comprising
      a power switch, the power switch being in operational communication with the plurality of batteries,
      a solar charge controller, the solar charge controller being in operational communication with the plurality of solar panels and the plurality of batteries, a battery charger, the battery charger being in operational communication with the generator and the plurality of batteries, an inverter, the inverter being in operational communication with the plurality of batteries and the plurality of outlets, a step-up inverter, the step-up inverter being in operational communication with the plurality of batteries, a bridge rectifier, the bridge rectifier being in operational communication with the step-up inverter, a potentiometer speed control, the potentiometer speed control being in operational communication with the bridge rectifier, a microcontroller, the microcontroller being in operational communication with the potentiometer speed control and the generator, and a pulse width modulator, the pulse width modulator being in operational communication with the microcontroller.

2. The rechargeable battery powered generator of claim 1 further comprising the generator comprising a motor, a belt, and a pair of alternators, the belt being coupled to each of the motor and the pair of alternators, the motor being in operational communication with the plurality of batteries, a charge alternator of the pair of alternators being in operational communication with the battery charger, an outlet alternator of the pair of alternators being in operational communication with the plurality of outlets, the motor being in operational communication with the microcontroller.

3. The rechargeable battery powered generator of claim 1 further comprising the microcontroller being Arduino.

4. The rechargeable battery powered generator of claim 1 further comprising the plurality of outlets comprising a left outlet bank and a right outlet bank, each of the left outlet bank and the right outlet bank having a plurality of AC outlets, the left outlet bank having a plurality of USB ports.

5. The rechargeable battery powered generator of claim 1 further comprising a vent cover coupled to a vent aperture extending through the rear panel to the inner compartment.

6. The rechargeable battery powered generator of claim 2 further comprising the housing having a main shelf, an alternator shelf, and a motor shelf, the main shelf being coupled to the rear panel, the left panel, and the right panel, the battery charger, the inverter, the microprocessor, and the pulse width modulator being coupled on the main shelf, the bridge rectifier, the step-up inverter, the potentiometer, and the plurality of batteries being coupled on the bottom panel, the alternator shelf being coupled to the rear panel above the main shelf, the pair of alternators being coupled on the alternator shelf, the motor shelf being suspended from the top panel by a pair of arms, each of the pair of arms having a compression spring, the motor being coupled on the motor shelf.

7. The rechargeable battery powered generator of claim 6 further comprising an automatic button belt tensioner coupled to the rear panel below the motor shelf, the automatic button belt tensioner being in operational communication with the motor shelf, the automatic button belt tensioner lowering and alternatively raising the motor shelf to decrease and alternatively increase tension in the belt.

8. The rechargeable battery powered generator of claim 6 further comprising a plurality of solar panel trays comprising a left solar panel tray, a right solar panel tray, and a storage solar panel tray, the left solar panel tray being coupled to the top panel proximal the left panel, the right solar panel tray being coupled to the top panel proximal the right panel, and the storage solar panel tray being coupled on the main shelf, the plurality of solar panel trays selectively receiving the plurality of solar panels.

9. The rechargeable battery powered generator of claim 1 further comprising a plurality of wheels coupled to the housing, the plurality of wheels being coupled to the bottom panel.

10. The rechargeable battery powered generator of claim 9 further comprising a handle coupled to the housing, the handle being coupled to the right panel.

11. A rechargeable battery powered generator comprising:

a housing having a front panel separated from a rear panel, a top panel separated from a bottom panel, and a left panel separated from a right panel, the front panel, the rear panel, the top panel, the bottom panel, the left panel, and the right panel forming an inner compartment, the front panel being removable, the rear panel having a vent aperture extending through to the inner compartment, the housing having a main shelf, an alternator shelf, and a motor shelf, the main shelf being coupled to the rear panel, the left panel, and the right panel, the alternator shelf being coupled to the rear panel above the main shelf, the motor shelf being suspended from the top panel by a pair of arms, each of the pair of arms having a compression spring;

a vent cover coupled to the vent aperture;

a plurality of solar panels;

a plurality of solar panel trays, the plurality of solar panel trays comprising a left solar panel tray, a right solar panel tray, and a storage solar panel tray, the left solar panel tray being coupled to the top panel proximal the left panel, the right solar panel tray being coupled to the top panel proximal the right panel, and the storage solar panel tray being coupled on the main shelf, the plurality of solar panel trays selectively receiving the plurality of solar panels;

a plurality of batteries coupled to the housing, the plurality of batteries being coupled on the bottom panel within the inner compartment;

a generator coupled to the housing, the generator being coupled within the inner compartment, the generator comprising a motor, a belt, and a pair of alternators, the belt being coupled to each of the motor and the pair of alternators, the pair of alternators being coupled on the alternator shelf, the motor being coupled on the motor shelf, the motor being in operational communication with the plurality of batteries, the pair of alternators comprising a charge alternator and an outlet alternator;

an automatic button belt tensioner coupled to the housing, the automatic button belt tensioner being coupled to the rear panel below the motor shelf, the automatic button belt tensioner being in operational communication with the motor shelf, the automatic button belt tensioner lowering and alternatively raising the motor shelf to decrease and alternatively increase tension in the belt;

a plurality of outlets coupled to the housing, the plurality of outlets being coupled to each of the left panel and the right panel adjacent the plurality of outlet apertures of the front panel, the plurality of outlets being in operational communication with the plurality of batteries and the outlet alternator, the plurality of outlets comprising a left outlet bank and a right outlet bank, each of the left outlet bank and the right outlet bank having a plurality of AC outlets, the left outlet bank having a plurality of USB ports;

an electrical system coupled to the housing, the electrical system being coupled within the inner compartment, the electrical system being in operational communication with each of the plurality of solar panels, the plurality of batteries, and the generator, the electrical system converting energy from the plurality of solar panels to charge the plurality of batteries, power the generator from the plurality of batteries, and convert power from the plurality of batteries and the generator to the plurality of outlets, the electrical system comprising:
- a power switch, the power switch being in operational communication with the plurality of batteries, the power switch being coupled to the right outlet bank;
- a solar charge controller, the solar charge controller being in operational communication with the plurality of solar panels and the plurality of batteries;
- a battery charger, the battery charger being coupled on the main shelf, the battery charger being in operational communication with the charge alternator and the plurality of batteries;
- an inverter, the inverter being coupled on the main shelf, the inverter being in operational communication with the plurality of batteries and the plurality of outlets;
- a step-up inverter, the step-up inverter being coupled on the bottom panel, the step-up inverter being in operational communication with the plurality of batteries;
- a bridge rectifier, the bridge rectifier being coupled on the bottom panel, the bridge rectifier being in operational communication with the step-up inverter;
- a potentiometer speed control, the potentiometer speed control being coupled on the bottom panel, the potentiometer speed control being in operational communication with the bridge rectifier;
- a microcontroller, the microcontroller being coupled on the main shelf, the microcontroller being in operational communication with the potentiometer speed control and the motor of the generator; and
- a pulse width modulator, the pulse width modulator being coupled on the main shelf, the pulse width modulator being in operational communication with the microcontroller;

a plurality of wheels coupled to the housing, the plurality of wheels being coupled to the bottom panel; and a handle coupled to the housing, the handle being coupled to the right panel.

\* \* \* \* \*